(12) United States Patent
Bhandaru et al.

(10) Patent No.: US 11,520,700 B2
(45) Date of Patent: Dec. 6, 2022

(54) TECHNIQUES TO SUPPORT A HOLISTIC VIEW OF CACHE CLASS OF SERVICE FOR A PROCESSOR CACHE

(71) Applicant: Intel Corporation, Santa Clara, CA (US)

(72) Inventors: Malini K. Bhandaru, San Jose, CA (US); Iosif Gasparakis, Hillsboro, OR (US); Sunku Ranganath, Beaverton, OR (US); Liyong Qiao, Beijing (CN); Rui Zang, Beijing (CN); Dakshina Ilangovan, San Jose, CA (US); Shaohe Feng, Beijing (CN); Edwin Verplanke, Chandler, AZ (US); Priya Autee, Chandler, AZ (US); Lin A. Yang, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 126 days.

(21) Appl. No.: 17/042,037

(22) PCT Filed: Jun. 29, 2018

(86) PCT No.: PCT/CN2018/093549
§ 371 (c)(1),
(2) Date: Sep. 25, 2020

(87) PCT Pub. No.: WO2020/000344
PCT Pub. Date: Jan. 2, 2020

(65) Prior Publication Data
US 2021/0026769 A1 Jan. 28, 2021

(51) Int. Cl.
*G06F 12/08* (2016.01)
*G06F 9/50* (2006.01)
(Continued)

(52) U.S. Cl.
CPC ........ *G06F 12/0806* (2013.01); *G06F 9/5016* (2013.01); *G06F 9/547* (2013.01)

(58) Field of Classification Search
None
See application file for complete search history.

(56) References Cited

U.S. PATENT DOCUMENTS

2005/0102465 A1* 5/2005 Royer .................. G06F 12/126
711/E12.075
2009/0178052 A1* 7/2009 Shen .................. G06F 12/0842
711/E12.001
(Continued)

FOREIGN PATENT DOCUMENTS

WO 2016085642 A1 6/2016

OTHER PUBLICATIONS

Fangfei Liu, et al., "CATalyst: Defeating last-level cache side channel attacks in cloud computing" 2016 IEEE International Symposium on High Performance Computer Architecture (HPCA), Mar. 12-16, 2018, 13 pages.
(Continued)

*Primary Examiner* — Kaushikkumar M Patel
(74) *Attorney, Agent, or Firm* — Compass IP Law PC

(57) ABSTRACT

A holistic view of cache class of service (CLOS) to include an allocation of processor cache resources to a plurality of CLOS. The allocation of processor cache resources to include allocation of cache ways for an n-way set of associative cache. Examples include monitoring usage of the plurality of CLOS to determine processor cache resource usage and to report the processor cache resource usage.

22 Claims, 9 Drawing Sheets

(51) Int. Cl.
*G06F 9/54* (2006.01)
*G06F 12/0806* (2016.01)

(56) References Cited

U.S. PATENT DOCUMENTS

| | | |
|---|---|---|
| 2011/0010503 A1* | 1/2011 | Yamamura ............ G06F 12/121 |
| | | 711/E12.001 |
| 2011/0113215 A1 | 5/2011 | Thomas et al. |
| 2014/0258595 A1 | 9/2014 | Venkatesha et al. |
| 2016/0154734 A1* | 6/2016 | Kim ...................... G06F 12/084 |
| | | 711/130 |
| 2016/0299849 A1 | 10/2016 | Herdrich et al. |
| 2017/0262375 A1 | 9/2017 | Jenne et al. |
| 2017/0359443 A1 | 12/2017 | Wei et al. |
| 2018/0052630 A1 | 2/2018 | Peng et al. |
| 2018/0285166 A1* | 10/2018 | Roy ...................... G06F 9/5016 |
| 2019/0028350 A1* | 1/2019 | Yeung ................... H04L 9/0894 |
| 2019/0034357 A1* | 1/2019 | Nunez Mencias .. G06F 12/1408 |

OTHER PUBLICATIONS

International Search Report and Written Opinion for PCT Patent Application No. PCT/CN2018/093549, dated Mar. 13, 2019, 9 pages.

Extended European Search Report for Patent Application No. 18924868.5, dated Dec. 16, 2021, 10 pages.

* cited by examiner

Code 300

```
Host.config {
If (CPUID == X) { // CPUID based
    CLOS: OS = mask(0x80..)
    CLOS: Infra = mask(0x7F..)
    CLOS: Best_Effort = mask(0x01..)
    CLOS: Burstable = mask(0x02)
    Guaranteed = mask(0x7C // sub-CLOS carved out of these, exclusively allocated to a process or process group.
} else (CPUID == Y) {
}
```

RECEIVE, AT A PROCESSOR CIRCUIT FOR A COMPUTING PLATFORM, INFORMATION TO ALLOCATE PROCESSOR CACHE RESOURCES TO A PLURALITY OF CLOS, THE ALLOCATED PROCESSOR CACHE RESOURCES INCLUDING AN N-WAY SET ASSOCIATIVE LLC FOR A PROCESSOR HOSTED BY THE COMPUTING PLATFORM, WHERE "N" IS ANY WHOLE, POSITIVE NUMBER GREATER THAN OR EQUAL TO 1
702

CAUSE ONE OR MORE CACHE WAYS OF THE N-WAY SET ASSOCIATIVE LLC TO BE ALLOCATED TO SEPARATE CLOS OF THE PLURALITY OF CLOS BASED ON THE INFORMATION MATCHING IDENTIFYING INFORMATION FOR AT LEAST THE PROCESSOR HOSTED BY THE COMPUTER PLATFORM
704

MONITOR USAGE OF THE PLURALITY OF CLOS WHILE THE COMPUTING PLATFORM SUPPORTS ONE OR MORE WORKLOADS TO DETERMINE PROCESSOR CACHE RESOURCE USAGE
706

REPORT THE DETERMINED PROCESSOR CACHE RESOURCE PRESSURE TO AN ORCHESTRATOR OF A NETWORK COUPLED WITH THE COMPUTING PLATFORM
708

*FIG. 7*

Storage Medium 800

Computer Executable Instructions for 700

*FIG. 8*

TECHNIQUES TO SUPPORT A HOLISTIC VIEW OF CACHE CLASS OF SERVICE FOR A PROCESSOR CACHE

TECHNICAL FIELD

Examples described herein are generally related to processor cache allocation via use of cache class of service (CLOS).

BACKGROUND

A processor of a computing platform coupled to a network (e.g., in a datacenter) may be associated with various types of resources that may be allocated to an application hosted by the computing platform. The various types of resources may include, but are not limited to, central processing unit (CPU) cores, system memory such as random access memory, network bandwidth or processor cache (e.g., last-level-cache (LLC)). Performance requirements for the application that may be based on service level agreements (SLAs) or general quality of service (QoS) requirements may make it necessary to reserve or allocate one or more of these various types of resources to ensure SLAs and/or QoS requirements are met.

BRIEF DESCRIPTION OF THE DRAWINGS

FIG. 3 illustrates an example code.
FIG. 7 illustrates an example of a logic flow.
FIG. 8 illustrates an example of a storage medium.

DETAILED DESCRIPTION

Relatively new technologies such as Intel® Resource Director Technology (RDT) allow for monitoring usage and allocation of processor cache that is mainly focused on defining cache classes of service (CLOS) and how to use bit masks such as capacity bitmasks (CBMs) to partition the processor cache to support the CLOS. In some implementations for these new technologies such as Intel® RDT, users may be able to use machine specific registers directly to partition the processor cache to support the CLOS. In other implementations, users may use kernel support such as Intel® developed Linux kernel support or access software libraries to assist in partitioning the processor cache to support the CLOS. However, these new technologies such as Intel® RDT currently tend to focus on the mechanics of monitoring and allocating the processor cache for a given application hosted by a computing platform rather than have a more holistic view of performance gains for the entire computing platform when allocating the processor cache to support the CLOS. This holistic view may be dependent on which workloads, including the computing platform's operating system (OS) are assigned to which processor cache partitions and whether assigned processor cache partitions are shared between two or more CLOS.

Figure 1:
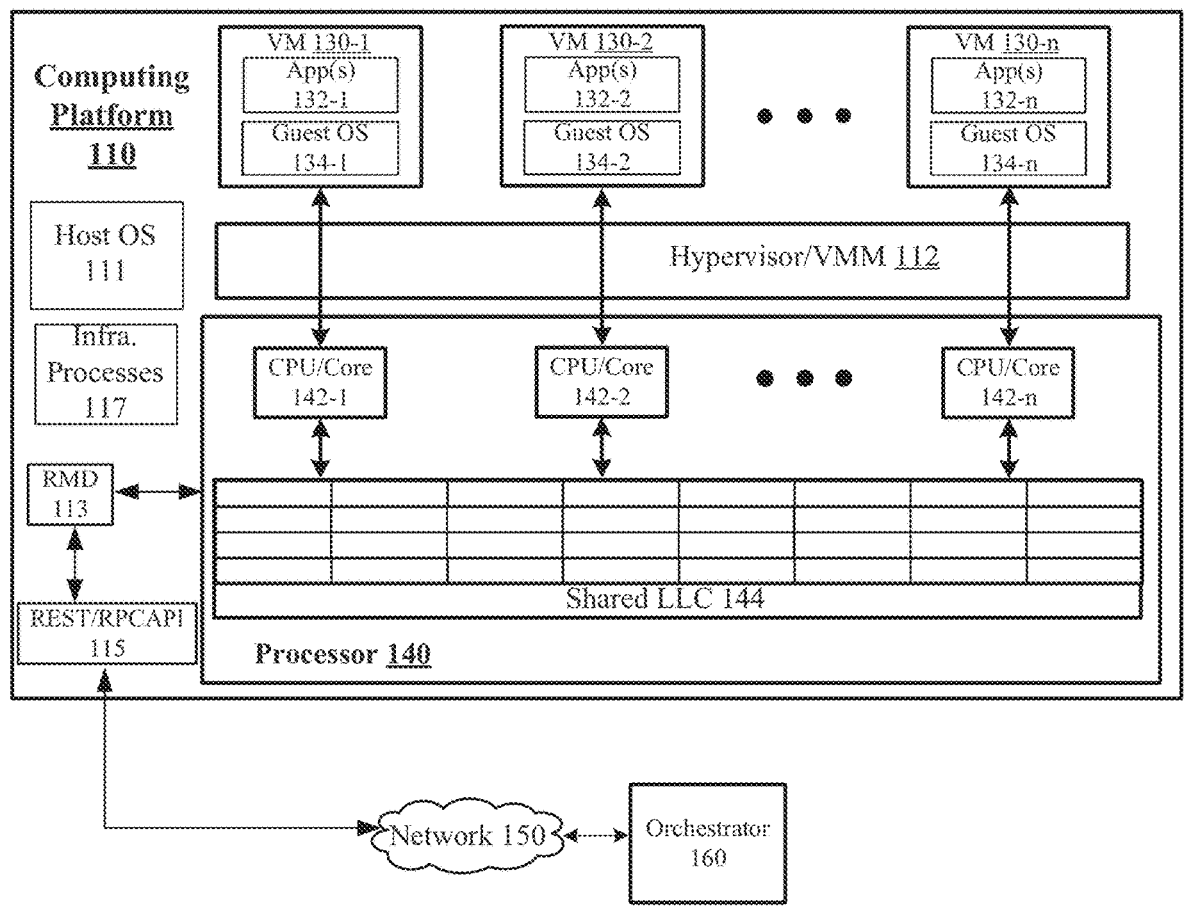
FIG. 1 illustrates an example first system.

FIG. 1 illustrates an example system 100. In some examples, as shown in FIG. 1, system 100 includes a computing platform 110 coupled through a network 150 with an orchestrator 160. For these examples, system 100 may be part of a datacenter and network 150 may represent elements of an internal network that communicatively couples a plurality of computing platforms, servers or nodes included in the datacenter such as communicatively coupling computing platform 110 with various other servers or nodes.

According to some examples, computing platform 110 may be a node composed of disaggregated resources (i.e., a node comprised of compute resources from a compute sled, storage resources from a storage sled, accelerator resources from an accelerator sled) in a datacenter to support VMs separately executing one or more applications such as providing network services and/or a network function to clients or customers. For example, VMs 130-1 to 130-*n* (where "n" represents any whole, positive integer greater than 1) and may be supported by composed computing resources associated with computing platform 110. VMs 130-1 to 130-*n* at computing platform 110 may be managed or controlled by a hypervisor/VM manager (VMM) such as hypervisor/VMM 112. In other examples, computing platform 110 may be configured as a more conventional server having the various above-mentioned computing resources contained within the same physical enclosure, chassis or container.

In some examples, as shown in FIG. 1, at least some of the composed computing resources for computing platform 110 may include a processor 140 having processing elements such as CPU/cores 142-1 to 142-*n* having a shared last-level cache (LLC) 144. CPU/cores 142-1 to 142-*n* may have shared access to LLC 144 to support respective VMs 130-1 to 130-*n*, applications (App(s)) 132-1 to 132-*n*, guest operating systems (OSs) 134-1 to 134-*n*, host OS 111 or infrastructure (Infra) processes 117. As described in more detail below, the shared access to LLC 144 by CPU/cores 142-1 to 142-*n* may be associated with a CLOS map that is managed by logic and/or features of a resource manager daemon (RMD) 113. The CLOS map may indicate how LLC 144 is partitioned to enable CPU/cores 142-1 to 142-*n* to support various workloads fulfilled by VMs 130-1 to 130-*n*, App(s) 132-1 to 132-*n*, guest OSs 134-1 to 134-*n*, host OS 111 or Infra processes 117. The partitioning of LLC 144 may be based on, but is not limited to, such cache allocation technologies as Intel® Cache Allocation Technology (CAT) that uses CLOS as a resource control tag via which VMs 130-1 to 130-*n*, App(s) 132-1 to 132-*n*, guest OSs 134-1 to 134-*n*, host OS 111 or Infra processes 117 may be grouped and each CLOS of a CLOS map may in turn have associated resource capacity bitmasks (CBMs) indicating how much of LLC 144 (e.g., number of cache ways) can be used by each CLOS of the CLOS map.

In some examples, infra processes 117 may include, but are not limited to, infrastructure processes such as an Open virtual switch (vSwitch). An Open vSwitch may be utilized by VMs 130-1 to 130-*n* for communication between these VMs or between VMs 130-1 to 130-*n* and/or other endpoints/VMs located on a separate computing platform. Other types of infrastructure processes may include use of data plane development kit (DPDK) libraries and network interface drivers for packet processing of data packets between VMs 130-1 to 130-*n* or between VMs 130-1 to 130-*n* and/or other endpoints/VMs located on a separate computing platform.

According to some examples, orchestrator 160 may include logic and/or features to manage or control some aspects of system 100 such as determining what processing workloads are to be hosted by what computing platform in system 100. For these examples, orchestrator 160 may request specific cache resources as part of a determination as to whether a potential host for a processing workload has adequate resources to support the processing workload. As mentioned in more detail below, a resource manager daemon at a computing platform such as RMD 113 may relay cache resource information to an orchestrator such as orchestrator 160 through a representational state transfer (REST) or remote procedure call (RPC) application interface (API)—REST/RPC API 115 (an RPC API may include an gRPC API). For example, the relayed cache resource information may be based, at least in part, on RMD 113 monitoring CLOS usage by VMs 130-1 to 130-*n*, App(s) 132-1 to 132-*n*, guest OSs 134-1 to 134-*n*, host OS 111 or Infra processes 117 as workloads associated with these various elements of computing platform 110 are supported by CPU/Cores 142-1 to 142-*n*.

In some examples, processor 140 including CPUs/cores 142-1 to 142-*n* may represent, either individually or collectively, various commercially available processors. The various commercially available processors may include, but are not limited to, processors designed to support or capable of supporting processor cache allocation technologies (CATs) such as Intel® CAT including without limitation an Intel® Xeon® or Intel® Xeon Phi® processors; and similar processors.

According to some examples, shared LLC 144 may be types of relatively fast access memory to serve as a shared LLC for CPUs/cores 142-1 to 142-*n* to minimize access latency. The types of relatively fast access memory included in shared LLC 144 may include, but is not limited to, volatile or non-volatile types of memory. Volatile types of memory may include, but is not limited to, static random access memory (SRAM) or dynamic random access memory (DRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magnetoresistive random access memory (MRAM) that incorporates memristor technology, spin transfer torque MRAM (STT-MRAM), or a combination of any of the above.

Figure 2:
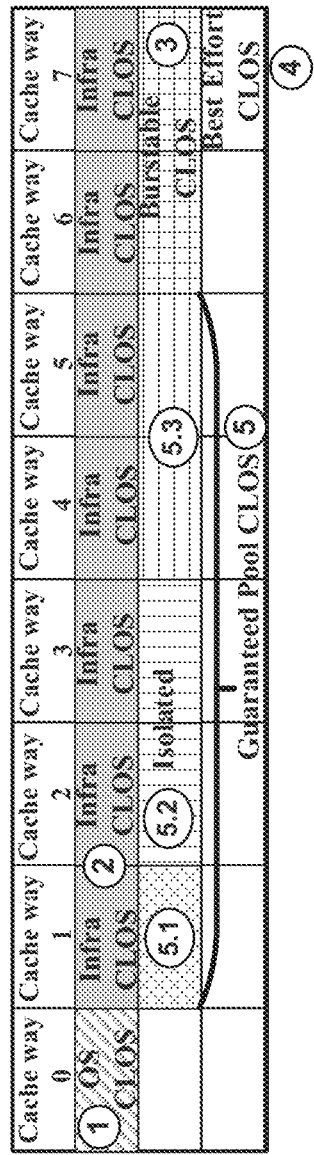
FIG. 2 illustrates an example Class of Service (CLOS) map.

FIG. 2 illustrates an example CLOS map 200. In some examples, as shown in FIG. 2, CLOS map 200 provides an example CLOS map for an 8-way set associative LLC. Examples are not limited to an 8-way set associative LLC. Any n-way set associative LLCs may be mapped in a similar manner as shown for CLOS map 200. For these examples, different CLOS are identified in CLOS map 200 for an OS CLOS (1), an Infra CLOS (2), a burstable CLOS (3) a best effort CLOS (4) and a guaranteed pool CLOS (5). Examples are not limited to only the types of CLOS shown in FIG. 2. Respective numbers of cache ways for LLC allocated to each example CLOS may be tuned (e.g., by a resource manager daemon such as RMD 113) based on anticipated and/or monitored workloads by elements of a computing platform (e.g., elements of computing platform 110).

According to some examples, OS CLOS (1) may be a CLOS having at least one cache way of a processor LLC dedicated to an OS (doesn't overlap with or is shared with any other CLOS). For example, a host OS, such as host OS 111, may have cache way 0 dedicated to the host OS. OS CLOS (1) may have the at least one cache way dedicated to the host OS to ensure at least some LLC resources are consistently available to the host OS.

Infra CLOS (2), for example, may be a CLOS that spans cache ways 1-7 and supports infrastructure resources such as, but not limited to, an Open vSwitch, or DPDK libraries and network interface drivers for packet processing. The spanning of these cache ways of a processor LLC ensure that data brought into the LLC such as data included in network packets may be accessible to their respective endpoints (e.g., VMs, containers, Apps, etc.) without a need for further copying.

Burstable CLOS (3) may be a CLOS having an allocation of one or more cache ways of a processor LLC. For example, as shown in FIG. 2, burstable CLOS (3) has been allocated cache ways 6 and 7. Burstable CLOS (3) may be allocated or assigned to workloads fulfilled by elements of a host computing platform that may need more LLC resources for predictability but may tolerate some variation in predictability (e.g., not having enough LLC resources during short, bursts of time). As shown in FIG. 2, burstable CLOS (3) may have some cache ways that overlap with or are shared with infra CLOS (2) (e.g., cache way 6) to facilitate low copy overhead while handling networking packets. Other cache ways of burstable CLOS (3) may be shared with both Infra CLOS (2) and an additional CLOS. For examples, cache way 7 of burstable CLOS (3) is shared with Infra CLOS (2) and best effort CLOS (4).

Best effort CLOS (4) may be a CLOS that has shared cache ways with Infra CLOS (2) as well as shared cache ways with other CLOS. For examples, as shown in FIG. 2, best effort CLOS (4) shares cache way 7 with burstable CLOS (3) as well as Infra CLOS (2). Best effort CLOS (4) may be a default CLOS for those workloads executed by elements of a computing platform not assigned to a given CLOS. Best effort CLOS (4) may typically be a lowest level of service, that has the most contention for resources. In other words, "best effort" may equate to "no promises" of cache resources.

Guaranteed pool CLOS (5) may be a CLOS having a pool of "isolated" cache ways of a processor LLC that may be exclusively (other than for Infra CLOS) allocated to a dynamically defined sub-CLOS. In some examples, workloads executed by elements of a computing platform that may need low latency and jitter may be able to request one or more cache ways from among the cache ways allocated to guaranteed pool CLOS (5). For example, a first workload may be grouped to sub-CLOS (5.1) based on a request for a single, isolated cache way. Meanwhile, second and third workloads may be grouped to respective sub-CLOS (5.2) and (5.3) based on respective requests for at least two, isolated cache ways. For these examples, the cache ways of guaranteed pool CLOS (5) may only be shared with Infra CLOS (2).

FIG. 3 illustrates an example code 300. In some examples, code 300 may be an example of a configuration file for a CPU identification (CPUID)/computing platform that may have specific conditional segments. For these examples, code 300 may be a way to configure an LLC using the various CLOS shown in FIG. 2 for CLOS map 200. The various CLOS may be pre-configured based on available cache ways. The available cache ways may be a function of the CPUID/platform. For example, some processors and/or platforms may have more or less than an 8-way LLC.

In some examples, code 300 may assume that the host platform with CPUID "X" has 8 distinct cache ways, with masks (e.g., CBMs) that may be two hexadecimal digits wide. A host platform with CPUID "Y" may have more or less distinct cache ways and thus masks may be more or less than two hexadecimal digits wide. Code 300 shows an example of a configuration file for CPUID "X" and an inference to a configuration file for CPUID "Y" if CPUID "Y" is being hosted instead of CPUID "X". CPUID "X" may represent a first processor skew that has a pre-configured CLOS-to-cache way map and CPUID "Y" may represent a second processor skew having a different pre-configured CLOS-to-cache way map. Examples are not limited to configuration files for just two types of CPUIDs, any number of different CPUIDs may have their respective LLCs configured using the various CLOS shown in FIG. 2 and FIG. 3. Also, a single CPUID may have more than one type of configuration based, at least in part, on varying types of workloads for a given platform. For example, network application types of workloads may differ from traditional web page server types of workloads.

According to some examples, code 300 may be executed during initialization of a host computing platform and the sizes initially assigned to the various CLOS may be tuned based on anticipated workloads at the host computing platform. For these examples, the CLOS may be tuned to better suit typical workloads anticipated in a deployment environment. For example, public cloud workloads may be very different from that deployed in a telecommunications cloud environment. Also, usage analysis once an LLC has been configured according to the various CLOS, may help to determine common chunk sizes (e.g., number of CLOS cache ways) for use in providing only fixed-size chunks for types of dynamically created CLOS such as those included in a sub-CLOS of a guaranteed pool CLOS. Providing only fixed-size chunks may ease billing determinations for charging more or less for these fixed-size chunks of LLC resources. Also, issues arising from processor cache fragmentation may also be reduced by providing only fixed-size chunks.

In some examples, when an application is launched on a host computing platform such as computing platform 110, a resource manager daemon such as RMD 113 may follow a policy to assign the application to a CLOS for use of LLC resources at the host computing platform. The policy may include a default assignment of a best effort CLOS if no specific request is made for a given CLOS. If a request is made for a given CLOS, the request may be honored if LLC resources are available for either a burstable CLOS or, if burstable CLOS not requested, from the guaranteed pool CLOS. For these examples, one or more sub-CLOS of guaranteed pool CLOS may be dynamically created based on available cache ways. This policy may be in a json string xml or other.

According to some examples, a security policy may also be implemented by a resource manager daemon such as RMD 113. The security policy may be implemented due to many cache or LLC side channel attacks taking advantage of some usage scenarios where a new process, application or workload starts using LLC resources (e.g., cache lines) and the old data is not flushed/cleared automatically. The new process, application or workload may need to explicitly flush cache ways. The security policy may also be implemented to prevent Prime+Probe type attacks possible because some CPU/cores that don't have explicitly assigned cache ways may still snoop in to cache ways that are reserved for other CPU/cores using CLOS mask. The security policy may enable a selection of multiple levels of security. A first security level (e.g., low level) may include no changes in actions for the resource manager daemon, a second security level (e.g., mid level) may include the resource manager daemon causing a flush of cache ways before cache ways are assigned to a new process, application or workload, and a third security level (e.g., a high level) may include the resource manager daemon using a pseudo cache locking API or restricted control file system and then dedicate these cache ways to applications that need this additional security protection, to prevent cache snoops from non-associated CPU/cores.

Figure 4:
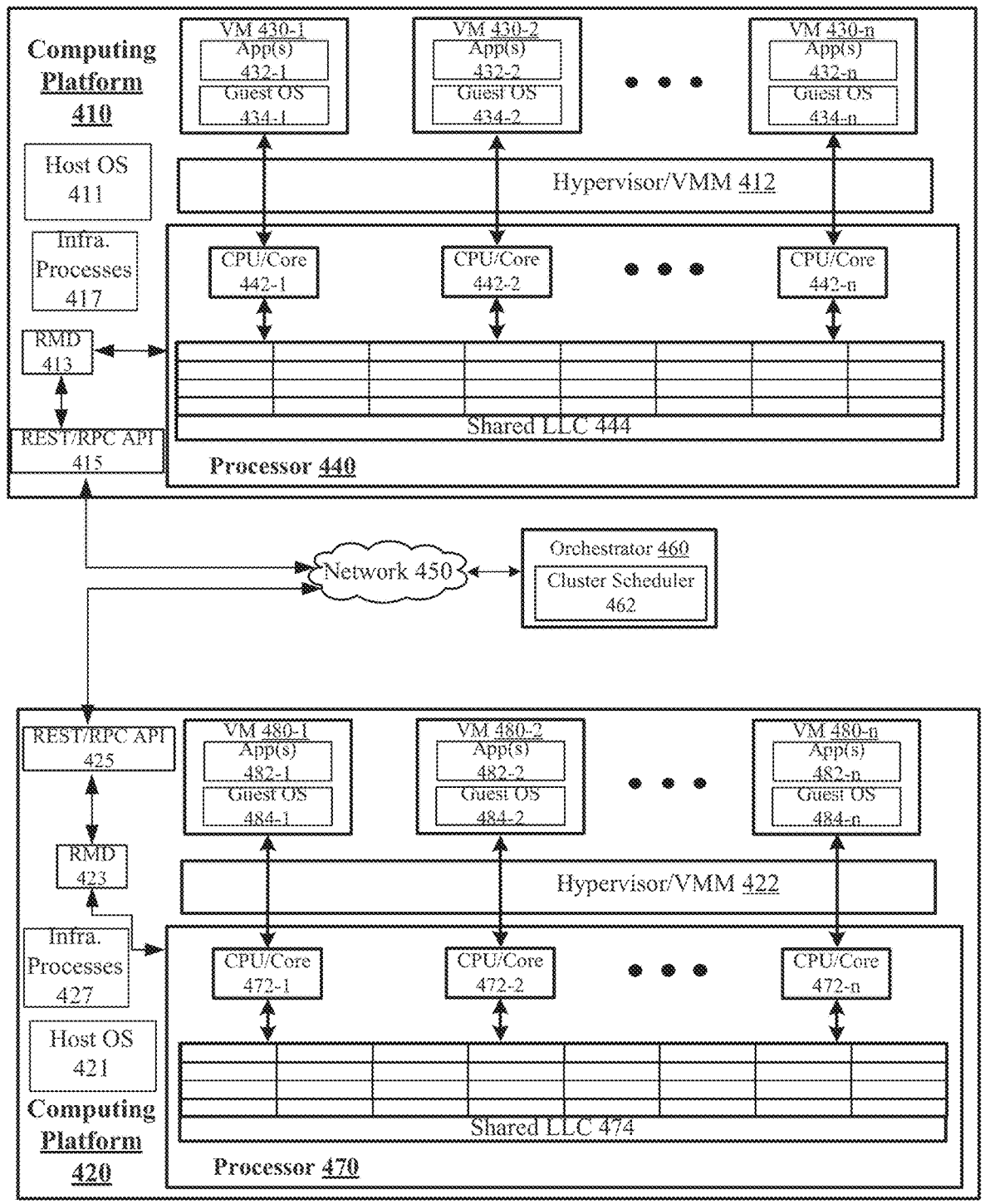
FIG. 4 illustrates an example second system.

FIG. 4 illustrates an example system 400. In some examples, as shown in FIG. 4, system 400 includes a computing platform 410 and a computing platform 420 that separately couple with an orchestrator 460 through a network 450. For these examples, similar to system 100 shown in FIG. 1, system 400 may be part of a datacenter and network 450 may represent elements of an internal network that communicatively couples a plurality of computing platforms, servers or nodes included in the datacenter such as communicatively coupling computing platform 410 and/or computing platform 420 with various other servers or nodes.

According to some examples, computing platform 410 and computing platform 420 may include similar elements to those described above and shown for FIG. 1. For example, computing platform 410 may have a resource monitoring daemon (RMD) 413 to facilitate allocation of cache resources included in shared LLC 444 and computing platform 420 may have an RMD 423 to facilitate allocation of cache resources included in shared LLC 474. As described more below, RMD 413 may communicate with a cluster scheduler 462 of orchestrator 460 through a REST/RPC API 415 and RMD 423 may communicate with cluster scheduler 462 through a REST/RPC API 425 as part of a process to reserve cache resources.

In some examples, shared access to shared LLC 444 by CPU/cores 442-1 to 442-*n* may be associated with or allocated based on a first CLOS map that may or may not match CLOS map 200 shown in FIG. 2. For example, the first CLOS map may have been adjusted/modified following an initial configuration of host computing platform 410. The first CLOS map may be used by RMD 413 to monitor and/or tune individual CLOS based on anticipated or current workloads being fulfilled by host OS 411, Infra processes 417, VMs 430-1 to 430-*n* App(s) 432-1 to 432-*n* or guest OSs 434-1 to 434-*n*.

According to some examples, shared access to shared LLC 474 by CPU/cores 472-1 to 472-*n* may be associated with or allocated based on a second CLOS map that may or may not match CLOS map 200 shown in FIG. 2. For example, the second CLOS map may have been adjusted/ modified following an initial configuration of host computing platform 420. The second CLOS map may be used by RMD 423 to monitor and/or tune individual CLOS based on anticipated or current workloads being fulfilled by host OS 421, Infra processes 427, VMs 480-1 to 480-*n* App(s) 482-1 to 482-*n* or guest OSs 484-1 to 484-*n*.

Figure 5:
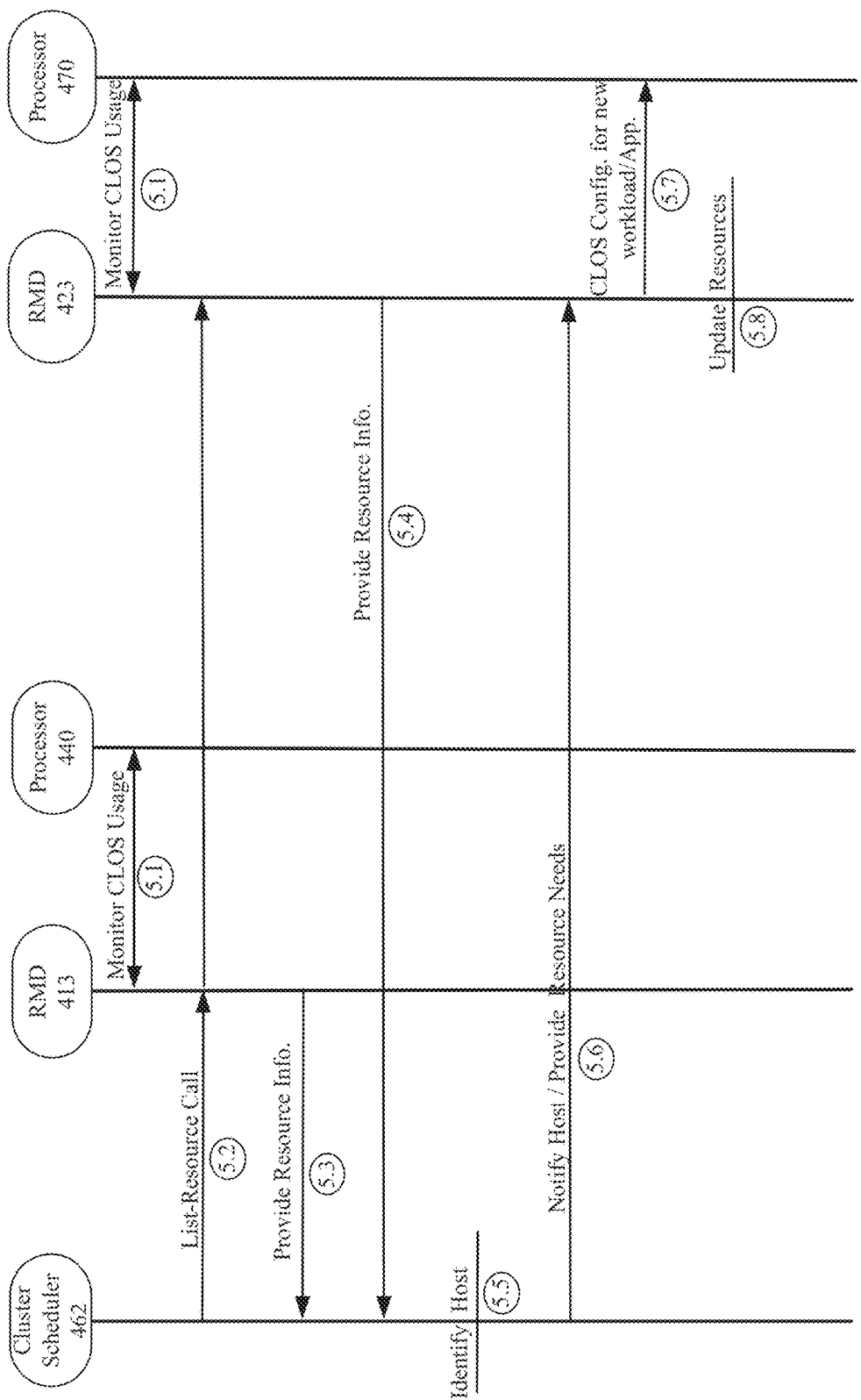
FIG. 5 illustrates an example process.

FIG. 5 illustrates an example process 500. In some examples, process 500 may represent a process for a cluster scheduler to reserve cache resources based on communicating with one or more resource manager daemons located at host computing platforms. For these examples, elements of system 400 as shown in FIG. 4, may be related to process 500. These elements of system 400 may include elements of host computing platform 410 (e.g., RMD 413 and processor 440), elements of host computing platform 420 (e.g., RMD 423 and processor 470), network 450, orchestrator 460 or cluster scheduler 462. However, example process 500 is not limited to implementations using elements of system 400 shown in FIG. 4 or mentioned above.

Beginning at process 5.1, logic and/or features of RMD 413 at computing platform 410 and of RMD 423 of computing platform 420 may monitor CLOS usage for respective shared LLCs 444 and 474. In some examples, RMD 413 or RMD 423 may utilize various monitoring technologies similar to Intel® RDT's cache monitoring technology (CMT). The logic and features of RMD 413 or of RMD 423 may monitor usage of shared LLCs 444 and 474 by VMs, App(s), guest OSs, host OSs or Infra processes hosted by respective computing platforms 410 and 420 and capture metrics or statistics of this usage.

Moving to process 5.2, cluster scheduler 462 may issue a List-Resource Call to RMD 413 and RMD 423. In some examples, the List-Resource Call may be routed through respective REST/RPC APIs 415 and 425 to reach RMD 413 and RMD 423.

Moving to process 5.3, logic and/or features of RMD 413 provide resource information (e.g., through REST/RPC API 415) that may include local cache information related to shared LLC 444 for processor 440. The provided resource information may include, but is not limited to, captured metrics or statistics of usage for the various CLOS assignments for shared LLC 444. The captured metrics or statistics may indicate available cache resources and/or cache resource usage pressure for the various CLOS assignments for shared LLC 444.

Moving to process 5.4, logic and/or features of RMD 423 may provide resource information (e.g., through REST/RPC API 425) that may include local cache information related to LLC 474 for processor 470. The provided resource information may include, but is not limited to, captured metrics or statistics of usage for the various CLOS assignments for LLC 474. The captured metrics or statistics may indicate available cache resources and/or cache resource usage pressure for the various CLOS assignments for LLC 474.

Moving to process 5.5, cluster schedule 462 may use the resource information provided by RMD 413 and RMD 423 to identify a possible host for a new workload. In some examples, certain workloads may be associated with launching or migrating a VM to computing platform 410 or 420. For these examples, reserving cache resources, particularly for latency/jitter sensitive workloads may be an important determination factor for launching or migrating a VM to a host computing platform. For example, if orchestrator 460 supports OpenStack operations, a VM launch may be likely to request cache resources as part of a flavor specified in a launch request. Flavors may be specified by cluster scheduler 462 where a specific CLOS may be used at an identified host for the VM launch. For example, a flavor for a pre-defined CLOS may indicate {RAM: 2 GB, vCPUs: 2, cache: Best-Effort}. A flavor for a variable size CLOS may indicate {RAM: 2 GB, vCPUs: 2, cache {min: 2, max: 4}}. Cluster schedule 462 may identify a host from among computing platform 410 or 420 that has an ability to support the requested parameters indicated in the flavor before the VM can be launched at the identified host.

Moving to process 5.6, cluster scheduler 462 may have determined that computing platform 420 had the resources to support the new workload based, at least in part, on the resource information provided by RMD 423. In some examples, cluster scheduler 462 may notify computing platform 420 it has been selected to host the new workload.

Cluster scheduler 462 may also indicate to RMD 423 (e.g., through REST/RPC API 425) what resource may be needed to support the new workload. The indicated resources may include LLC resources needed from processor 440 to support the new workload.

Moving to process 5.7, logic and/or features of RMD 423, may tune or reconfigure CLOS allocations for LLC 474 for processor 470 based on the LLC resources indicated as needed by cluster scheduler 462 for the new workload and based on use of the CLOS allocations by VMs, App(s), guest OSs, etc. to support this new workload.

Moving to process 5.8, logic and/or features of RMD 423 may update the second CLOS map to reflect the new workload. The update of the second CLOS map may represent an update of at least some of the resources monitored by RMD 423 at computing platform 420. Process 500 may then return to process 5.1 for RMDs 413 and 423 to monitor respective CLOS usage at respective processors 440 and 470.

According to some alternative examples, system 400 may include multiple cluster schedulers to achieve greater parallelism. For these examples, separate cluster schedulers of orchestrator 460 may communicate with RMD 413 and RMD 423. Once a new workload is successfully scheduled from these separate cluster schedulers, RMD 413 and RMD 423 may update resource information and then emit a heartbeat to the multiple cluster schedulers to indicate resource updates that may reflect any CLOS changes. RMD 413 and RMD 423 may also emit heartbeats periodically to the multiple cluster schedulers to possibly indicate any tuning of CLOS that may occur as a workload is hosted by respective computing platforms 410 and 420.

According to some other alternative examples, a with a proxy to RMD 413 and/or RMD 423 may be maintained at cluster scheduler 462. For these other alternative examples, RMD 413 and RMD 423 may periodically update snapshots of resource allocations at respective computing platform 410 or 420 responsive to List-Resources calls from cluster scheduler 462. Cluster scheduler 462 may utilize these proxy RMD 413 or RMD 423 for a quick consultation for scheduling workloads.

Figure 6:
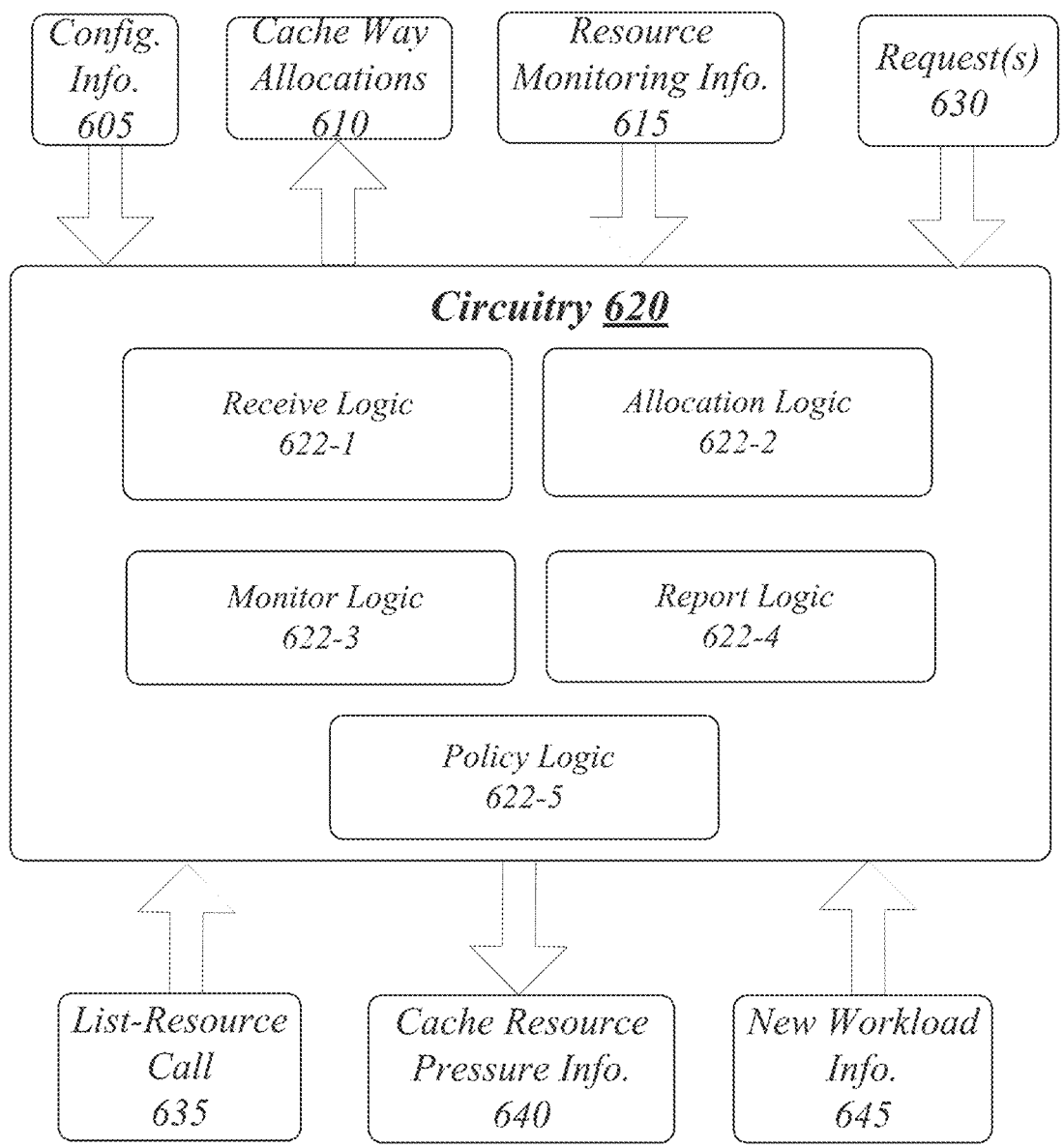
FIG. 6 illustrates an example block diagram for an apparatus.

FIG. 6 illustrates an example block diagram for apparatus 600. Although apparatus 600 shown in FIG. 6 has a limited number of elements in a certain topology, it may be appreciated that the apparatus 600 may include more or less elements in alternate topologies as desired for a given implementation.

According to some examples, apparatus 600 may be supported by circuitry 620. For these examples, circuitry 620 may be at an ASIC, FPGA, processor, processor circuit, CPU, or core of a CPU for a platform, e.g., platform 110 shown in FIG. 1. For these examples, the ASIC, FPGA, processor, processor circuit, CPU, or one or more cores of a CPU may support logic and/or features of a resource monitoring daemon coupled with a REST-API such as RMD 113 coupled with REST/RPC API 115 to facilitate processor cache allocation for a processor hosted by a computing platform such as computing platform 110 that may include apparatus 600. Circuitry 620 may be arranged to execute one or more software or firmware implemented modules, components or logic 622-$a$ (module, component or logic may be used interchangeably in this context). It is worthy to note that "a" and "b" and "c" and similar designators as used herein are intended to be variables representing any positive integer. Thus, for example, if an implementation sets a value for a=5, then a complete set of software or firmware for modules, components or logic 622-$a$ may include logic 622-1, 622-2, 622-3, 622-4 and/or 622-5. The examples presented are not limited in this context and the different variables used throughout may represent the same or different integer values. Also, "logic", "module" or "component" may also include software/firmware stored in computer-readable media, and although types of logic are shown in FIG. 6 as discrete boxes, this does not limit these types of logic to storage in distinct computer-readable media components (e.g., a separate memory, etc.).

According to some examples, as mentioned above, circuitry 620 may include an ASIC, an FPGA, a processor, a processor circuit, a CPU, or one or more cores of a CPU. Circuitry 620 may be generally arranged to execute one or more software components 622-a. Circuitry 620 may be all or at least a part of any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors.

According to some examples, apparatus 600 may include receive logic 622-1. Receive logic 622-1 may be executed by circuitry 620 to receive information to allocate processor cache resources to a plurality of CLOS, the allocated processor cache resources to include an n-way set associative LLC for a processor hosted by the computing platform that includes apparatus 600, where "n" is any whole, positive number greater than or equal to 1. For these examples, the received information may be included in configuration information 605. Configuration information 605, in some examples, may include pre-defined CLOS for the plurality of CLOS that may include a host OS CLOS, an infrastructure processes CLOS, a burstable CLOS, a best effort CLOS or a guaranteed pool CLOS.

In some examples, apparatus 600 may include an allocation logic 622-2. Allocation logic 622-2 may be executed by circuitry 620 to cause one or more cache ways of the n-way set associative LLC to be allocated to separate CLOS of the plurality of CLOS based on the information including identification information that matches identification information for at least the processor hosted by the computer platform. For these examples, the configuration information may include a CPUID that matches a CPUID of the processor hosted by the computing platform. Also, the one or more cache ways may be allocated according to cache way allocations 610 that may include a CLOS map similar to CLOS map 200 shown in FIG. 2.

According to some examples, apparatus 600 may also include a monitor logic 622-3. Monitor logic 622-3 may be executed by circuitry 620 to monitor usage of the plurality of CLOS while the computing platform supports one or more workloads to determine processor cache resource usage. For these examples, resource monitor information 615 may include information gathered by monitor logic 622-3 regarding usage of the plurality of CLOS.

In some examples, apparatus 600 may also include a report logic 622-4. Report logic 622-4 may be executed by circuitry 620 to report the determined processor cache resource pressure through the REST/RPC API to an orchestrator of the network coupled to the computing platform. For these examples, report logic 622-4 may send the determined processor cache resource pressure responsive to a list-resource call from the orchestrator that may be included in list-resource call 635. The determined processor cache resource pressure may be included in cache resource pressure information 640. Logic and/or features of the orchestrator (e.g., a cluster schedule) may use the cache resource pressure information to select the computing platform for launching a new workload or application. Information for the new workload may be included in new workload information 645.

According to some examples, apparatus 600 may also include a policy logic 622-5. Policy logic 622-5 may be executed by circuitry 620 to implement various policies related to reserving cache ways of the n-way set associative LLC for the processor hosted by the computing platform that includes apparatus 600 or related to security level policies for one or more of the plurality of CLOS or related to how cache ways allocated to a given CLOS from among the plurality of CLOS may be made available to applications executed by the processor.

Various components of apparatus 600 and a device or node implementing apparatus 600 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 7 illustrates an example logic flow 700. Logic flow 700 may be representative of some or all of the operations executed by one or more logic, features, or devices described herein, such as apparatus 700. More particularly, logic flow 700 may be implemented by at least receive logic 622-1, allocation logic 622-2, monitor logic 622-3 or report logic 622-4.

According to some examples, logic flow 700 at block 702 may receive, at a processor circuit for a computing platform, information to allocate processor cache resources to a plurality of CLOS, the allocated processor cache resources including an n-way set associative LLC for a processor hosted by the computing platform, where "n" is any whole, positive number greater than or equal to 1. For these examples, receive logic 622-1 may receive the information.

In some examples, logic flow 700 at block 704 may cause one or more cache ways of the n-way set associative LLC to be allocated to separate CLOS of the plurality of CLOS based on the information matching identifying information for at least the processor hosted by the computer platform. For these examples, allocation logic 622-2 may cause the one or more cache ways of the n-way set associative LLC to be allocated to the separate CLOS.

According to some examples, logic flow 700 at block 706 may monitor usage of the plurality of CLOS while the computing platform supports one or more workloads to determine processor cache resource usage. For these examples, monitor logic 622-3 may monitor the usage.

In some examples, logic flow 700 at block 708 may report the determined processor cache resource pressure to an orchestrator of a network coupled with the computing platform. For these examples, report logic 822-4 may report the determined processor cache resource pressure (e.g., through a REST/RPC API) on a periodic basis or responsive to a list-resource call from the orchestrator.

FIG. 8 illustrates an example storage medium 800. As shown in FIG. 8, the first storage medium includes a storage medium 800. The storage medium 800 may comprise an article of manufacture. In some examples, storage medium 800 may include any non-transitory computer readable medium or machine readable medium, such as an optical, magnetic or semiconductor storage. Storage medium 800 may store various types of computer executable instructions, such as instructions to implement logic flow 700. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
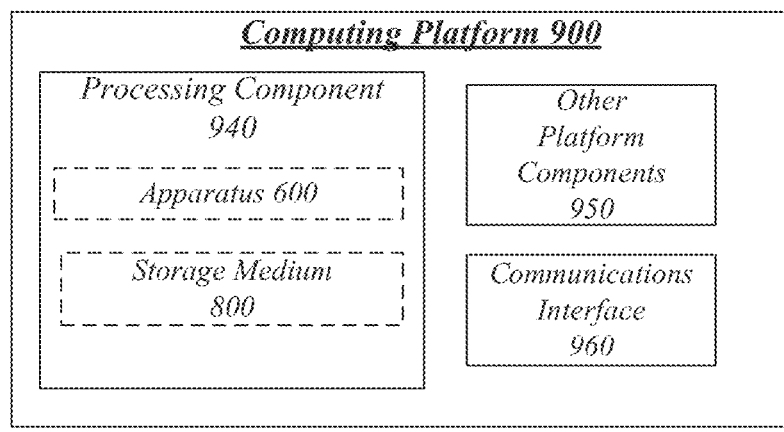
FIG. 9 illustrates an example computing platform.

FIG. 9 illustrates an example computing platform 900. In some examples, as shown in FIG. 9, computing platform 900 may include a processing component 940, other platform components 950 or a communications interface 960. According to some examples, computing platform 900 may be similar to computing platform 110 shown in FIG. 1 or computing platforms 410 or 420 shown in FIG. 4. Similar to computing platforms 110, 410 or 420, computing platform 900 may be capable of coupling to an orchestrator through a network and may be part of a datacenter including a plurality of network connected computing platforms.

According to some examples, processing component 940 may execute processing operations or logic for apparatus 600 and/or storage medium 800. Processing component 940 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 950 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D cross-point memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 960 may include logic and/or features to support a communication interface. For these examples, communications interface 960 may include one or more communication interfaces that operate according to various communication protocols or standards to communicate over direct or network communication links or channels. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Hardware Abstraction API Specification.

As mentioned above computing platform 900 may be implemented in a server of a datacenter. Accordingly, functions and/or specific configurations of computing platform 900 described herein, may be included or omitted in various embodiments of computing platform 900, as suitably desired for a server deployed in a datacenter.

The components and features of computing platform 900 may be implemented using any combination of discrete circuitry, ASICs, logic gates and/or single chip architectures. Further, the features of computing platform 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled" or "coupled with", however, may also mean that two or more elements are not in direct contact with each other, but yet still co-operate or interact with each other.

The following examples pertain to additional examples of technologies disclosed herein.

Example 1

An example apparatus may include a REST API or an RPC API to communicatively couple a computing platform with a network. The apparatus may also include circuitry at the computing platform, the circuity may execute logic to receive information to allocate processor cache resources to a plurality of CLOS. The allocated processor cache resources may include an n-way set associative LLC for a processor hosted by the computing platform, where "n" is any whole, positive number greater than or equal to 1. The logic may also cause one or more cache ways of the n-way set associative LLC to be allocated to separate CLOS of the plurality of CLOS based on the information including identification information that matches identification information for at least the processor hosted by the computer platform.

Example 2

The apparatus of example 1, the logic may also monitor usage of the plurality of CLOS while the computing platform supports one or more workloads to determine processor cache resource pressure and report the determined processor cache resource pressure through the REST API or the RPC API to an orchestrator of the network coupled to the computing platform.

Example 3

The apparatus of example 2, the logic may report determined processor cache resource pressure on a periodic basis or report determined processor cache resource pressure responsive to receiving a list-resource call from the orchestrator through the REST API or the RPC API.

Example 4

The apparatus of example 1, the plurality of CLOS may include a plurality of predefined CLOS that includes a host OS CLOS, an infrastructure processes CLOS, a burstable CLOS, a best effort CLOS or a guaranteed pool CLOS.

Example 5

The apparatus of example 4, the logic may also implement a policy to reserve at least one cache way of the n-way set associative LLC for allocation only to the host OS CLOS.

Example 6

The apparatus of example 4, the logic may also implement a policy to have the best effort CLOS be a default CLOS if a CLOS from among the plurality of CLOS is not requested by an application being executed by the processor, the best effort CLOS to have allocated cache ways that are shared with the infrastructure processes CLOS and burstable CLOS.

Example 7

The apparatus of example 4, the logic may also implement a policy to reserve a portion of cache ways of the guaranteed pool CLOS for an application being executed by the processor. The portion of the cache ways may be reserved based on whether one or more cache ways of the guaranteed pool CLOS are not reserved by a different application being executed by the processor.

Example 8

The apparatus of example 1, the logic may also implement a security policy for use of the plurality of CLOS. The security policy may include a first security level to flush cache ways allocated to a CLOS of the plurality of CLOS when the CLOS is reassigned from a first application being executed by the processor to a second application being executed by the processor or a second security level that includes use of dedicated cache ways only for cache hits from one or more associated cores for an application being executed by the one or more associated cores.

Example 9

The apparatus of example 1, may also include a digital display coupled to the circuitry to present a user interface view.

Example 10

An example method may include receiving, at a processor circuit for a computing platform, information to allocate processor cache resources to a plurality of CLOS. The allocated processor cache resources may include an n-way set associative LLC for a processor hosted by the computing platform, where "n" is any whole, positive number greater than or equal to 1. The method may also include causing one or more cache ways of the n-way set associative LLC to be allocated to separate CLOS of the plurality of CLOS based on the information including identification information that matches identification information for at least the processor hosted by the computer platform.

Example 11

The method of example 10 may also include monitoring usage of the plurality of CLOS while the computing platform supports one or more workloads to determine processor cache resource pressure. The method may also include reporting the determined processor cache resource pressure to an orchestrator of a network coupled with the computing platform.

Example 12

The method of example 11 may also include reporting the determined processor cache resource pressure to the orchestrator through a REST API or an RPC API.

Example 13

The method of example 12 may also include reporting determined processor cache resource pressure based on monitoring usage of the plurality CLOS on a periodic basis or reporting responsive to receiving a list-resource call from the orchestrator through the REST API or the RPC API.

Example 14

The method of example 10, the plurality of CLOS may include a plurality of predefined CLOS that includes a host operating system (OS) CLOS, an infrastructure processes CLOS, a burstable CLOS, a best effort CLOS or a guaranteed pool CLOS.

Example 15

The method of example 14 may also include implementing a policy to reserve at least one cache way of the n-way set associative LLC for allocation only to the host OS CLOS.

Example 16

The method of example 14 may also include implementing a policy to have the best effort CLOS be a default CLOS if a CLOS from among the plurality of CLOS is not requested by an application being executed by the processor. The best effort CLOS may have allocated cache ways that are shared with the infrastructure processes CLOS and burstable CLOS.

Example 17

The method of example 14 may also include implementing a policy to reserve a portion of cache ways of the guaranteed pool CLOS for an application being executed by the processor. The portion of the cache ways may be reserved based on whether one or more cache ways of the guaranteed pool CLOS are not reserved by a different application being executed by the processor.

Example 18

The method of example 10 may also include implementing a security policy for use of the plurality of CLOS. The security policy may include a first security level to flush cache ways allocated to a CLOS of the plurality of CLOS when the CLOS is reassigned from a first application being executed by the processor to a second application being executed by the processor or a second security level that uses dedicated cache ways only for cache hits from one or more associated cores for an application being executed by the one or more associated cores.

Example 19

An example at least one machine readable medium may include a plurality of instructions that in response to being executed by a system may cause the system to carry out a method according to any one of examples 10 to 18.

Example 20

An example apparatus may include means for performing the methods of any one of examples 10 to 18.

Example 21

An example at least one machine readable medium may include a plurality of instructions that in response to being executed by a system at a computing platform may cause the system to receive information to allocate processor cache resources to a plurality of CLOS. The allocated processor cache resources may include an n-way set associative LLC for a processor hosted by the computing platform, where "n" is any whole, positive number greater than or equal to 1. The instructions may also cause the system to cause one or more cache ways of the n-way set associative LLC to be allocated to separate CLOS of the plurality of CLOS based on the information including identification information that matches identification information for at least the processor hosted by the computer platform.

Example 22

The at least one machine readable medium of example 21, the instructions may also cause the system to monitor usage of the plurality of CLOS while the computing platform supports one or more workloads to determine processor cache resource pressure. The instructions may also cause the system to report the determined processor cache resource pressure to an orchestrator of a network coupled with the computing platform.

Example 23

The at least one machine readable medium of example 21, the instructions may cause the system to report the determined processor cache resource pressure to the orchestrator through a REST API or a RPC API.

Example 24

The at least one machine readable medium of example 23, the instructions may cause the system to report determined processor cache resource pressure based on monitoring usage of the plurality CLOS on a periodic basis or reporting responsive to receiving a list-resource call from the orchestrator through the REST API or the RPC API.

Example 25

The at least one machine readable medium of example 21, the plurality of CLOS may include a plurality of predefined CLOS that includes a host operating system (OS) CLOS, an infrastructure processes CLOS, a burstable CLOS, a best effort CLOS or a guaranteed pool CLOS.

Example 26

The at least one machine readable medium of example 25, the instructions may also cause the system to implement a policy to reserve at least one cache way of the n-way set associative LLC for allocation only to the host OS CLOS.

Example 27

The at least one machine readable medium of example 25, the instructions may also cause the system to implement a policy to have the best effort CLOS be a default CLOS if a CLOS from among the plurality of CLOS is not requested by an application to be executed by the processor. The best effort CLOS may have allocated cache ways that are shared with the infrastructure processes CLOS and burstable CLOS.

Example 28

The least one machine readable medium of example 25, the instructions may also cause the system to implement a policy to reserve a portion of cache ways of the guaranteed pool CLOS for an application being executed by the processor. The portion of the cache ways reserved based on whether one or more cache ways of the guaranteed pool CLOS are not reserved by a different application being executed by the processor.

Example 29

The least one machine readable medium of example 21, the instructions may also cause the system to implement a security policy for use of the plurality of CLOS. The security policy may include a first security level to flush cache ways allocated to a CLOS of the plurality of CLOS when the CLOS is reassigned from a first application being executed by the processor to a second application being executed by the processor or a second security level that uses dedicated cache ways only for cache hits from one or more associated cores for an application being executed by the one or more associated cores.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
a representational state transfer (REST) application interface (API) or a remote procedure call (RPC) API; and
circuitry, at a computing platform, to communicatively couple with a network through the REST API or the RPC API, the circuitry to execute logic to:
receive information to allocate processor cache resources to a plurality of class of service (CLOS), the allocated processor cache resources to include an n-way set associative last level cache (LLC) for a processor hosted by the computing platform, where "n" is any whole, positive number greater than or equal to 2; and
cause one or more cache ways of the n-way set associative LLC to be allocated to separate CLOS of the plurality of CLOS based on the information including identification information that matches identification information for at least the processor hosted by the computer platform, wherein the plurality of CLOS include a host operating system CLOS and at least one CLOS selected from an infrastructure processes CLOS, a burstable CLOS, a best effort CLOS or a guaranteed pool CLOS.

2. The apparatus of claim 1, further comprising the logic to:
monitor usage of the plurality of CLOS while the computing platform supports one or more workloads to determine processor cache resource pressure; and
report the determined processor cache resource pressure through the REST API or the RPC API to an orchestrator of the network coupled to the computing platform.

3. The apparatus of claim 2, comprising the logic to report determined processor cache resource pressure on a periodic basis or report determined processor cache resource pressure responsive to receiving a list-resource call from the orchestrator through the REST API or the RPC API.

4. The apparatus of claim 1, further comprising the logic to:
implement a policy to reserve at least one cache way of the n-way set associative LLC for allocation only to the host OS CLOS.

5. The apparatus of claim 1, further comprising the logic to:
implement a policy to have the best effort CLOS be a default CLOS if a CLOS from among the plurality of CLOS is not requested by an application being executed by the processor, the best effort CLOS to have allocated cache ways that are shared with the infrastructure processes CLOS and burstable CLOS.

6. The apparatus of claim 1, further comprising the logic to:
implement a policy to reserve a portion of cache ways of the guaranteed pool CLOS for an application being executed by the processor, the portion of the cache ways reserved based on whether one or more cache ways of the guaranteed pool CLOS are not reserved by a different application being executed by the processor.

7. A method comprising:
receiving, at a processor circuit for a computing platform, information to allocate processor cache resources to a plurality of class of service (CLOS), the allocated processor cache resources including an n-way set associative last level cache (LLC) for a processor hosted by the computing platform, where "n" is any whole, positive number greater than or equal to 2; and
causing one or more cache ways of the n-way set associative LLC to be allocated to separate CLOS of the plurality of CLOS based on the information including identification information that matches identification information for at least the processor hosted by the computer platform, wherein the plurality of CLOS include a host operating system CLOS and at least one CLOS selected from an infrastructure processes CLOS, a burstable CLOS, a best effort CLOS or a guaranteed pool CLOS.

8. The method of claim 7, comprising:
monitoring usage of the plurality of CLOS while the computing platform supports one or more workloads to determine processor cache resource pressure; and
reporting the determined processor cache resource pressure to an orchestrator of a network coupled with the computing platform.

9. The method of claim 8, comprising reporting the determined processor cache resource pressure to the orchestrator through a representational state transfer (REST) application interface (API) or a remote procedure call (RPC) API.

10. The method of claim 9, comprising reporting determined processor cache resource pressure based on monitoring usage of the plurality CLOS on a periodic basis or reporting responsive to receiving a list-resource call from the orchestrator through the REST API or the RPC API.

11. The method of claim 7, comprising implementing a policy to reserve at least one cache way of the n-way set associative LLC for allocation only to the host OS CLOS.

12. The method of claim 7, comprising implementing a policy to have the best effort CLOS be a default CLOS if a CLOS from among the plurality of CLOS is not requested by an application being executed by the processor, the best effort CLOS having allocated cache ways that are shared with the infrastructure processes CLOS and burstable CLOS.

13. The method of claim 7, comprising implementing a policy to reserve a portion of cache ways of the guaranteed pool CLOS for an application being executed by the processor, the portion of the cache ways reserved based on whether one or more cache ways of the guaranteed pool CLOS are not reserved by a different application being executed by the processor.

14. The method of claim 7, comprising implementing a security policy for use of the plurality of CLOS, the security policy including a first security level to flush cache ways allocated to a CLOS of the plurality of CLOS when the CLOS is reassigned from a first application being executed by the processor to a second application being executed by the processor or a second security level that uses dedicated cache ways only for cache hits from one or more associated cores for an application being executed by the one or more associated cores.

15. At least one non-transitory machine readable medium comprising a plurality of instructions that in response to being executed by a system at a computing platform cause the system to:
    receive information to allocate processor cache resources to a plurality of class of service (CLOS), the allocated processor cache resources to include an n-way set associative last level cache (LLC) for a processor hosted by the computing platform, where "n" is any whole, positive number greater than or equal to 2; and
    cause one or more cache ways of the n-way set associative LLC to be allocated to separate CLOS of the plurality of CLOS based on the information including identification information that matches identification information for at least the processor hosted by the computer platform, wherein the plurality of CLOS include a host operating system CLOS and at least one CLOS selected from an infrastructure processes CLOS, a burstable CLOS, a best effort CLOS or a guaranteed pool CLOS.

16. The at least one non-transitory machine readable medium of claim 15, the instructions to further cause the system to:
    monitor usage of the plurality of CLOS while the computing platform supports one or more workloads to determine processor cache resource pressure; and
    report the determined processor cache resource pressure to an orchestrator of a network coupled with the computing platform.

17. The at least one non-transitory machine readable medium of claim 16, comprising the instructions to cause the system to report the determined processor cache resource pressure to the orchestrator through a representational state transfer (REST) application interface (API) or a remote procedure call (RPC) API.

18. The at least one non-transitory machine readable medium of claim 17, comprising the instructions to cause the system to report determined processor cache resource pressure based on monitoring usage of the plurality CLOS on a periodic basis or reporting responsive to receiving a list-resource call from the orchestrator through the REST API or the RPC API.

19. The at least one non-transitory machine readable medium of claim 15, comprising the instructions to further cause the system to:
    implement a policy to reserve at least one cache way of the n-way set associative LLC for allocation only to the host OS CLOS.

20. The at least one non-transitory machine readable medium of claim 15, comprising the instructions to further cause the system to:
    implement a policy to have the best effort CLOS be a default CLOS if a CLOS from among the plurality of CLOS is not requested by an application to be executed by the processor, the best effort CLOS to have allocated cache ways that are shared with the infrastructure processes CLOS and burstable CLOS.

21. The least one non-transitory machine readable medium of claim 15, comprising the instructions to further cause the system to:
    implement a policy to reserve a portion of cache ways of the guaranteed pool CLOS for an application being executed by the processor, the portion of the cache ways reserved based on whether one or more cache ways of the guaranteed pool CLOS are not reserved by a different application being executed by the processor.

22. The least one non-transitory machine readable medium of claim 15, comprising the instructions to further cause the system to:
    implement a security policy for use of the plurality of CLOS, the security policy including a first security level to flush cache ways allocated to a CLOS of the plurality of CLOS when the CLOS is reassigned from a first application being executed by the processor to a second application being executed by the processor or a second security level that uses dedicated cache ways only for cache hits from one or more associated cores for an application being executed by the one or more associated cores.

\* \* \* \* \*